United States Patent

[11] 3,587,355

[72] Inventor Robert H. Schaefer
Westfield, Ind.
[21] Appl. No. 852,774
[22] Filed Aug. 25, 1969
[45] Patented June 28, 1971
[73] Assignee General Motors Corporation, Detroit, Mich.

[54] TRANSMISSION AND SHIFT CONTROL SYSTEM
36 Claims, 11 Drawing Figs.
[52] U.S. Cl. .................................................. 74/868
[51] Int. Cl. ...................................................... B60k 19/14
[50] Field of Search ........................................... 74/868,
878, 867, 865, 863

[56] References Cited
UNITED STATES PATENTS
3,387,508 6/1968 Searles et al. ................ 74/864
3,398,607 8/1968 Chana ......................... 74/864

*Primary Examiner*—Leonard H. Gerin
*Attorneys*—W. E. Finken and A. M. Heiter

ABSTRACT: An engine driven multispeed transmission having an automatic shift control system having an automatic shift valve which is spring biased to a downshift position, upshifted in response to a pressure proportional to the output shaft speed and further controlled by two signal pressures proportional to torque demand on the engine to provide upshifts at speed values which gradually increase and downshifts at lower speed values which increase more rapidly as the torque demand increases from low to high values so the difference between the upshift speed and the downshift speed gradually decreases with increasing torque demand to provide an automatic transmission shift control which shifts in response to decreasing changes in speed with increasing torque demand for optimum performance. Manual overcontrols, a throttle actuated detent may provide shifting at output speeds at or slightly higher than the maximum torque demand automatic upshift speed and a manual range selector may provide shifting at a higher output speed than detent shift speed.

Fig. 1

INVENTOR.
Robert H. Schaefer

INVENTOR.
Robert H. Schaefer
BY
A. M. Heiter
ATTORNEY

TRANSMISSION AND SHIFT CONTROL SYSTEM

This invention relates to automatic transmissions and more particularly to automatic speed and torque demand control systems.

Automatic transmissions now employ an automatic shift valve having a governor pressure acting in an upshift direction and a spring bias and various torque demand pressures acting in a downshift direction in order to provide upshifts at transmission output speeds which increase as throttle or torque demand on the engine is increased and downshifts at downshift speeds of a lower value and increasing at the same or a lower rate as torque demand increases from zero to full throttle. The difference between the upshift speed and downshift speed at each torque demand value remains the same or increases with increasing torque demand. Thus, at higher speeds and higher torque demands, the transmission shifting has the same or less sensitivity to changes in throttle position. In order to provide high performance, as required in a vehicle drive for passing or hill climbing, a full throttle detent downshift is provided.

The applicant's invention provides a change speed transmission having an automatic shift control system including a shift valve controlled by a speed responsive signal and an opposing net effective variable bias signal, which includes torque demand control, for providing governor upshifts at gradually increasing speeds from a low to a high torque demand value and governor downshifts at speeds increasing at a higher rate from a low to a high torque demand value. The difference between the upshift and downshift speeds diminishes as the torque demand increases to provide more sensitive shift control at high speed and power requirements.

At low torque demand values this control system changes the drive speed in response to larger changes in output speed so each drive speed is retained over a larger speed range commensurate with low torque demand operating requirements for optimum performance and pleasability. As the torque demand increases, changes in drive speed are made in response to proportionately smaller changes in output speed so each drive speed is retained over a smaller speed range to meet the optimum high torque demand performance requirements. At full torque demand each drive speed is retained over a minimum range of speeds since there is a minimum difference between the upshift and downshift speeds for optimum performance. Thus, the detent-type downshift is not required for high performance, but may be used to shift in anticipation of the need for increased performance.

This is accomplished in a shift valve shifted in response to an upshift governor speed signal varying directly with output speed and a downshift net effective variable bias including a spring bias, a downshift bias in the upshift and downshift positions varying directly with torque demand and an additional bias varying inversely with torque demand operative in the downshift direction on the shift valve only in the downshifted position of the valve. In a further improvement providing this type automatic shifting, the shift valve is similarly acted on by governor pressure in an upshift direction and a net effective variable bias including a spring bias in the downshift direction and a single inverted torque demand bias varying inversely with torque demand acting on one area of the shift valve in an upshift direction during upshifting and on a larger area during downshifting. The inverted torque demand bias has a zero value at full throttle and thus has absolute accuracy. The net effective variable bias may also include a hysteresis bias effective after an upshift determining the minimum speed differential between upshift and downshift speeds at full throttle torque demand.

Manual overcontrol of this automatic shift control system is provided by a detent control and a range selector control. The detent control is actuated by throttle movement at or beyond full throttle and provides detent pressure acting on the shift valve so the shift valve upshifts and downshifts at a speed slightly higher than the upshift speed at full torque demand so the operator can downshift in anticipation of an increased load and the resulting reduction in speed. The range selector provides a range selection pressure, which disconnects the detent pressure from the shift valve, and acts on the shift valve to hold the shift valve downshifted so the transmission operates in a lower speed drive when the engine is driving the output, but which will upshift in response to higher overrun speeds.

An object of the invention is to provide an improved automatic shift control system providing a decreasing difference between the upshift speed and the downshift speed as the torque demand increases.

Another object of the invention is to provide in a multispeed transmission driven by an engine having an engine speed for maximum rated power, an automatic shift control having a full torque demand upshift speed substantially equal to said engine speed and a full torque demand downshift speed only sufficiently less than said upshift speed to prevent hunting.

Another object of the invention is to provide in a multispeed transmission driven by an engine having a fuel feed governor for providing a constant governed engine speed, an automatic shift control having a full torque demand upshift speed only sufficiently less than governed engine speed so that this upshift speed does not exceed governed engine speed due to governor tolerance variations and is a slightly lower speed than the speed where power is the same before and after the shift and a full torque demand downshift speed only sufficiently less than said upshift speed to prevent hunting.

Another object of the invention is to provide in a multispeed transmission driven by an engine having a fuel feed control providing a variable speed input to the transmission and an automatic shift control having a full torque demand upshift speed equal to the maximum rated power speed of the engine and a full torque demand downshift speed only sufficiently less than said upshift speed to prevent hunting determined only by a predetermined hysteresis bias on the shift control.

Another object of the invention is to provide in a multispeed transmission for use with an engine providing maximum rated power at a rated engine speed, an automatic shift control responsive to a transmission output speed signal and a torque demand signal to provide a maximum difference between the higher upshift speed and a lower downshift speed at the minimum torque demand value and both upshift and downshift speeds increasing and the speed difference decreasing with increasing torque demand to a maximum upshift speed substantially equal to said rated engine speed and a speed a little less than the speed at which power is the same before and after the shift and a minimum speed difference at maximum torque demand determined by a hysteresis force only sufficient to prevent objectionable hunting.

Another object of this invention is to provide an automatic transmission control system having a shift control responsive to output speed and torque demand to provide upshift speeds which increase at a slow rate and downshift speeds which increase at a higher rate as torque demand is increased and wherein the difference between the upshift and downshift speed at each torque demand value decreases as the torque demand increases.

Another object of the invention is to provide in an automatic transmission and control system a shift control responsive to a governor force directly proportional to output speed in an upshift direction, a constant bias in a downshift direction and at least one torque demand downshift bias inversely proportional to the torque demand and operative in combination so the upshift speeds increase at a lower rate than the downshift speeds with increasing torque demand and the difference therebetween diminishes as the torque demand increases from low to high torque demand.

Another object of the invention is to provide an automatic transmission control system having a shift control responsive to a governor force directly proportional to output speed in an upshift direction, a constant bias in a downshift direction, a first torque demand signal directly proportional to torque demand in a downshift direction and a second torque demand signal inversely proportional to torque demand in a downshift direction only during upshifting operation to provide a differential between upshift and downshift speeds at each torque demand value decreasing with increasing torque demand.

Another object of the invention is to provide an automatic transmission control system having a shift control responsive to a governor force directly proportional to output speed in an upshift direction, a constant bias in a downshift direction and a torque demand signal inversely proportional to torque in an upshift direction acting at one force level in the downshift position and at a proportionally higher force level in the upshift position to provide a differential speed between the upshift and downshift speeds at each torque demand value decreasing with increasing torque demand.

Another object of the invention is to provide a pressure inverting valve having a regulating valve element biased by a spring for maximum pressure and for minimum pressure by the inverted regulated pressure in a chamber and a strut transmitting a force proportional to torque demand extending into said chamber and engaging the valve element.

Another object of the invention is to provide in a spring controlled valve a spring seat ring for a coil spring having a plurality of opposed pairs of varying height recesses to adjustably support the seat on a transverse fastening pin also supporting a stop and guide pin for the coil spring.

Another object of the invention is to provide in a valve assembly having a plurality of coil spring controlled valve elements in a row each having a spring seat ring having a plurality of opposed pairs of varying height recesses and a stop and guide pin extending through the seat ring and spring and a fastening pin extending through the valve body and a pair of recesses of each seat ring and an aperture in each stop pin.

Figure 1:
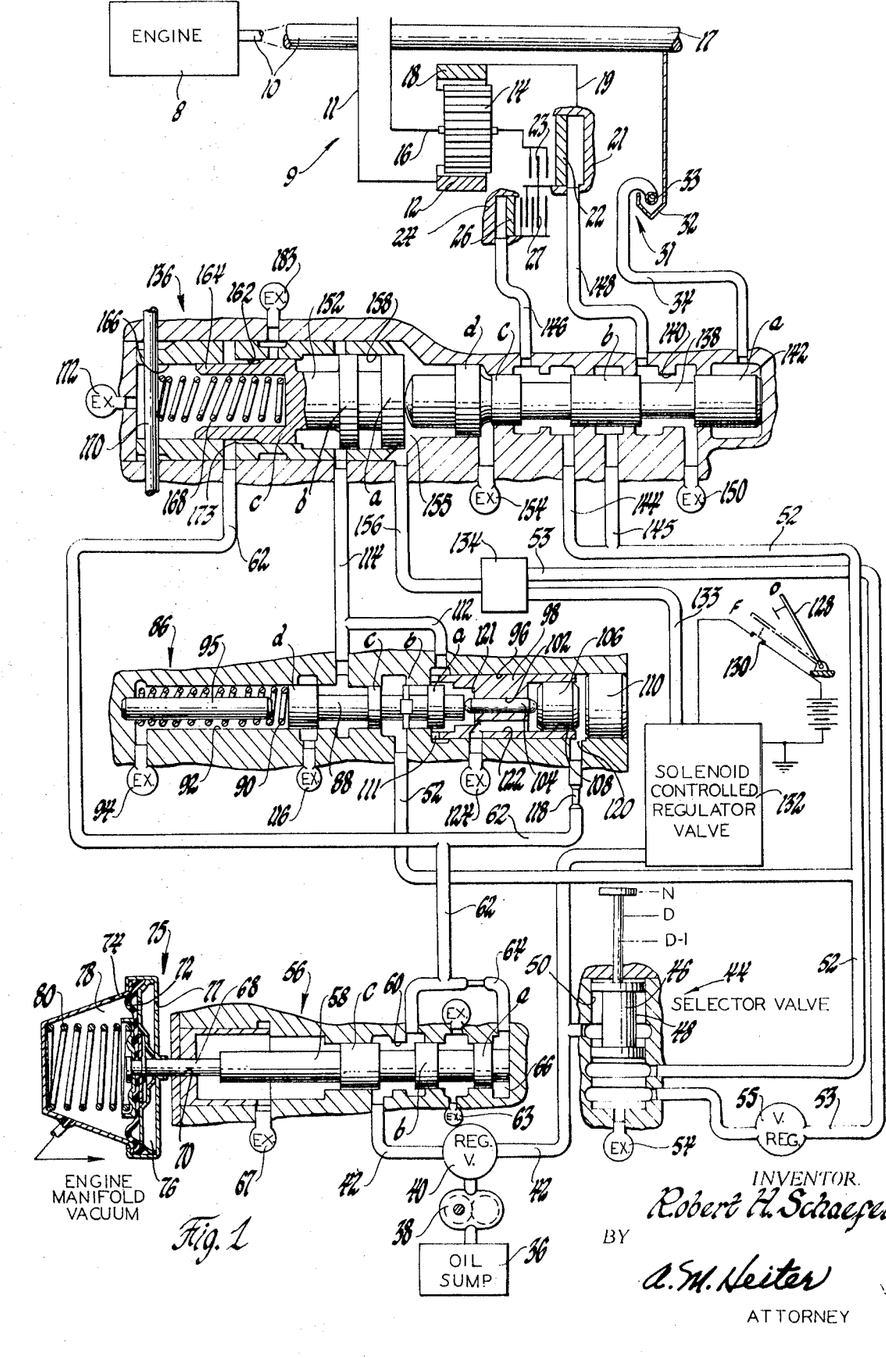
FIG. 1 schematically shows a transmission and control system therefor applying plural torque demand pressures for automatic shifting.

This invention in an automatic speed change transmission employs a multispeed transmission drive providing two or more speeds, illustrated by the simple two speed gear unit 9 driven by an engine 8 providing an engine manifold vacuum signal which is a function of torque demand. The engine may have a throttle pedal for manual control of fuel feed or a speed governor controlling fuel feed for constant output speed which may be varied by a speed control pedal similar to the throttle pedal. The input shaft 10 drives the input drum 11 and ring gear 12 which meshes with the planetary pinions 14 rotatably mounted on the carrier 16 which drives the output shaft 17. The pinions 14 mesh with the control sun gear 18 which is drive connected to sleeve shaft and drum 19 which has a rotating cylinder 21. When fluid pressure is supplied to the cylinder 21, the piston 22 therein moves to engage the clutch 23 to connect the carrier 16 and sun gear 18 to lock up the gear set for a 1:1 drive.

The sun gear 18 is also connected by the shaft and drum 19 to the rotary plates of the brake 27. When fluid is supplied to the fixed cylinder 24 to move the piston 26 to engage the fixed and rotary plates of brake 27, the sun gear 18 is held to provide a reduction or low speed drive.

Figure 9:
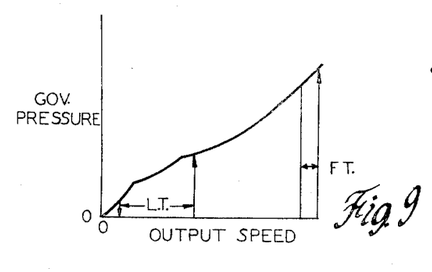
FIG. 9 shows a governor pressure curve.

A suitable governor, such as pitot governor 31 or a stepped governor, provides a governor signal pressure proportional to output shaft speed in the governor signal line 34. FIG. 9 is illustrative of a typical stepped governor pressure curve. The governor 31 is illustrated as a pitot tube governor having an annular can 32 mounted for rotation with the output shaft 17 and filled with fluid from the lubrication line, not shown. Rotation of the body of fluid in the annular can or trough 32 impinges on the pitot tube end 33 and provides in line 34 the governor signal pressure.

In the automatic control system, exhausted oil from the control system and lubrication system returns to the sump 36 in the base of the transmission housing and is delivered by an input driven pump 38 or a combination of input and output driven pumps. The pump 38 delivers the fluid under pressure to the regulator valve 40 which regulates the pressure of fluid in the main line 42. The selector valve 44 has a valve element 46 having a recess 48 between two lands and is mounted for reciprocal movement in the bore 50. In the neutral position N shown, the main line 42 is blocked and the drive line 52 and drive 1 line 53 are connected to exhaust 54.

When the valve is moved to the drive position D, drive main line 42 is connected to drive line 52 and drive 1 line 53 remains connected to exhaust 54. In the drive 1 position D1, main line 42 is connected to drive line 52 and drive 1 line 53. Drive 1 line 53 has a regulator valve 55 regulating drive 1 pressure at a lower value, i.e. 30 p.s.i. than main line pressure, i.e. 100 to 150 p.s.i.

The vacuum modulator valve 56 has a valve element 58 having equal diameter lands $a$, $b$ and $c$ located in a bore 60. The main line 42 is connected at all times to the recess between the lands $b$ and $c$ and when the valve is in the feed position, shown, to the modulator line 62.

The modulator line 62 is connected by the restrictive branch 64 to the closed end 66 of bore 60 to act on the end of valve element 58 to bias the valve to the closed position where land $b$ closes the port to modulator line 62 and with a small additional movement to open modulator line 62 to exhaust 63. The other end of valve element 58 in the chamber vented by exhaust 67 is engaged by a stem 68 passing through an opening 70 in the end of the valve body. The stem is secured to a diaphragm 72 sealed in the vacuum modulator can 74 of a vacuum actuator 75 which has an atmospheric chamber 76 having an atmospheric vent 77 on one side and a vacuum chamber 78 on the other side connected to engine manifold vacuum. Spring 80, mounted between the fixed can 74, biases the diaphragm 72 and the stem 68 against the opposing bias by the modulator pressure in chamber 66.

Figure 3:
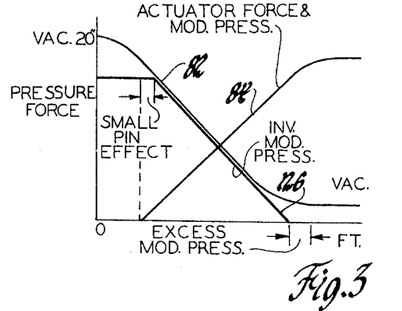
FIG. 3 shows torque demand pressure curves for FIG. 1.

FIG. 3 illustrates a normal engine vacuum curve 82 which decreases with increasing throttle or torque demand and is constant in a high range of throttle values. The engine vacuum at idle or zero throttle values and low values completely overcomes the spring so there is no vacuum actuator force or vacuum modulator pressure but thereafter, as engine vacuum is reduced, the constant force of spring 80, less the decreasing vacuum force, provides an increasing actuator force according to curve 84 and the modulator valve 56 then provides a modulated pressure represented by same curve 84. Since the vacuum is substantially constant in a small range of high throttle values, the modulated pressure in line 62 as shown by curve 84 is also constant in a range of high throttle values.

The inverted modulator pressure regulator valve 86 has a valve element 88 having equal diameter lands $a$, $b$, $c$ and $d$ and is biased in one direction by spring 90 located in spring chamber 92 which is vented by exhaust 94. The stop pin 95 within the spring limits compression of the spring and valve movement. At the other end of the valve element 88, there is an enlarged bore portion 96 having fixed therein a partition wall 98 having a small central bore 102 with a pin or strut 104 sliding therein. A plug 106 is slidably mounted in a bore 108 in the partition wall 98. A closure 110 closes the end of bore 96. The land $b$ of valve element 88 is a guide land with suitable openings that permit flow of fluid therethrough. Thus on the supply of main line pressure via drive line 52 fluid fills the space between lands $a$ and $c$ and in the extreme right or feed position of the valve, fluid flows around land $a$ to chamber 121 to act on the right end of valve element 88 and flows through the inverted modulator branch line 112 to the inverted modulator line 114. Note that partition 98 has openings or slots 111 for communication between chamber 121 and line 112. When the inverted modulator pressure in line 114 reaches the regulated value determined by spring 90, valve 88 moves to the left first to a closed position blocking all flow and then to an exhaust position connecting line 114 between lands $c$ and $d$ to exhaust 116. The modulator pressure in line 62 is connected, via the restriction 118 to smooth out pressure changes, to a closed chamber 120 between the end closure 110 and plug 106 and acts on plug 106 to transmit a force via pin 104 to the end of valve 88 to act against the spring and reduce the pressure value of the inverted modulator pressure in line 114. Closed end of bore 108 between the plug 106, pin 104 and wall 98 is vented by passage 122 which is continuously connected to exhaust 124. The inverted modulator pressure, illustrated by curve 126 in FIG. 3, is maximum at idle, and remains maximum for a small range of low throttle openings where there is no modulator pressure and for a small additional throttle travel due to the effect of the inverted modulator pressure in chamber 121 acting on the small end of the pin 104 and opposing the force of modulator pressure acting on the plug 106. Thus the inverted modulator pressure at low throttle values is maximum and constant and accurately determined by the spring force, land area and pin area at low throttle values where vacuum does not accurately represent torque demand. Then increasing modulator pressure acting on plug 106 opposes the regulating force of the spring 90 and reduces the inverted modulator pressure in a proportional manner with increasing throttle openings, and reaches zero value just before the modulator pressure reaches maximum value due to the excess of modulator force over the force of spring 90 and remains at zero value in the remaining range of high throttle values to full throttle as indicated by curve 126.

The inverted modulator pressure is reduced to zero just before modulator pressure reaches a maximum so that inverted modulator pressure is always zero at full throttle notwithstanding tolerance variations and vacuum variations resulting, for example, from altitude changes.

The shift valve 136 has a valve element 138 having lands $a$, $b$, $c$ and $d$ located in a stepped bore 140. The land $a$ is slightly smaller than the land $b$ to provide primary hysteresis. Lands $b$ and $c$ are the same diameter. Land $d$ may be larger than land $c$ to provide the required area for a manual downshift only at proper speeds. Governor pressure in line 34 enters chamber 142 to act on the end of land $a$ to urge the shift valve element 138 from the downshift position shown to the upshift position. In this downshift position, drive line pressure in line 52 is connected via branch 144 between the lands $b$ and $c$ to the low brake apply line 146. The high clutch apply line 148 is connected between lands $a$ and $b$ to exhaust 150. This places the transmission unit in the low speed drive. The space between lands $c$ and $d$ is vented by exhaust 154. The chamber 155 between the shift valve element 138 and control valve element 152 may be supplied through downshift line 156 with drive 1 pressure from line 53 and shuttle valve 134, constructed like valve 390 described below, to provide a manual downshift at proper speeds. If detent pressure is present in line 133, in drive operation with drive 1 line exhausted, the shuttle valve 134 connects it to downshift line 156 and chamber 155 with the selector valve in drive position and without detent pressure for automatic shifting, chamber 155 is exhausted. The control valve 152 has two large lands $a$ and $b$ mounted in a large bore 158 and a smaller land $c$ mounted in the smaller bore 162. An end portion 164 of the control valve element has a smaller diameter than land $c$ and is slidably sealed in the smallest bore portion 166. A spring 168 seated on a pin 170 located in a spring chamber vented by exhaust 172, acts on the control valve 152 which acts on the shift valve to bias both valves in a downshift direction in all valve positions. The modulator pressure line 62 is connected to the bore 158 at step 173 so modulated pressure acts on the unbalanced area of land $c$ of control valve element 152 to provide a torque demand force in a downshift direction in all positions. When the control valve element is in the downshift position shown, inverted modulator pressure line 114 is connected between lands $b$ and $c$ and acts on the unbalanced area of larger land $b$ to provide a force in a downshift direction. When the control valve element is in an upshift position the space between lands $b$ and $c$ is connected to exhaust 183 and inverted modulator pressure line 114 is connected between equal diameter lands $a$ and $b$ of control valve element 152 and does not exert a force on the valve element. With the control and shift valves 152 and 138 in the downshift position, when governor pressure in chamber 142 overcomes the spring bias, modulator force and inverted modulator force, both valves upshift to high position connecting low brake apply line 146 to exhaust 154 and branch 145 of drive line 52 to high clutch apply line 148 for a shift from low to high speed drive. On this shift, inverted modulated pressure supplied by line 114 no longer acts on the control valve element as pointed out above and main pressure being supplied between lands $a$ and $b$ for the high clutch acts on the unbalanced area of land $b$ to provide a primary hysteresis force to decrease the downshift speed. Both valves 152 and 138 downshift when the force provided by the spring and modulator pressure overcome force provided by the governor pressure and primary hysteresis pressure.

OPERATION

With the engine running providing manifold vacuum which varies inversely with throttle position or torque demand and the pump 38 providing pressure in main line 42, vacuum modulator valve 56 provides modulator pressure in line 62 which is zero in a small range of low torque demand values and increases with increasing torque demand as illustrated by curve 84, FIG. 3, and inverted modulator valve 86 provides inverted modulator pressure in line 114 which has a constant maximum value in a small range of low torque demand values and decreases with increasing torque demand and is zero in a small range of maximum torque demand values. When the selector valve 44 is moved from neutral to the drive position, main line pressure is connected by drive line 52 and shift valve element 138 in the downshift position to apply low brake 27 for low speed drive.

Figure 5:
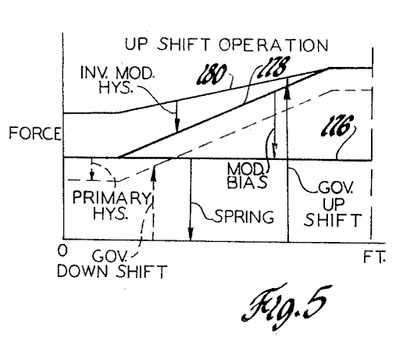
FIGS. 5 and 6 respectively show upshift and downshift operation curves for FIG. 1.

With the shift valve element 138 and control valve element 152 in the downshift position shown, the spring 168 provides a constant downshift bias force between zero and full throttle as illustrated by curve 176, FIG. 5. The vacuum modulator pressure in line 62 acting on land $c$ of control valve element 152 provides an additional downshift bias force varying in the same manner as modulator pressure with throttle position which, when added to the spring force, provides a spring and modulator summation force illustrated by the curve 178. The inverted modulator pressure in line 114 acting on land $b$ of the control valve element 152 provides an additional downshift bias force varying in the same manner as inverted modulator pressure with throttle position which, when added to the spring and modulator forces illustrated by spring and modulator force summation curve 178, provides the total spring, vacuum modulator and inverted modulator force illustrated by total summation curve 180, which illustrates for upshift operation, the total of the biasing forces on the control valve element 152 acting on the shift valve element 138 in a downshift direction. Thus curve 180, between the constant values at the lowest and highest range of throttle positions increases at a slower rate than curve 178 because the unbalanced area of land $b$ is less than the unbalanced area of land $c$ or the maximum inverted modulator pressure 126 is less than the maximum modulator pressure 84 or both. The curve 180 represents that force which the governor pressure force must exceed between zero and full throttle or torque demand to upshift the shift valve.

Figure 6:
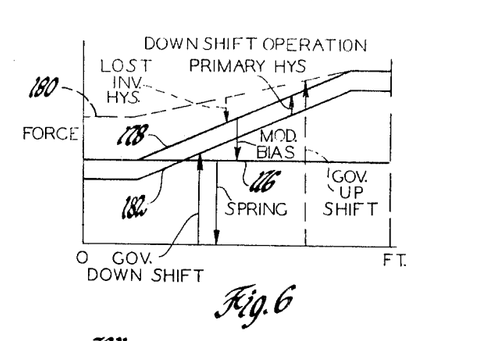

When the shift valve 136 upshifts, the forces acting on the shift and control valve elements 138 and 152 are shown by the solid line curves in FIG. 6. The dotted curve 180 illustrates the inverted modulator pressure force lost on upshifting. On the upshift, inverted modulator pressure is blocked between equal diameter lands *a* and *b* and the unbalanced chamber between lands *b* and *c* of control valve element 152 is vented to exhaust 183 to lose or discontinue the inverted modulator force. The spring force shown by curve 176 and the summation of spring force and modulator pressure force shown by curve 178 remain the same as described above when the shift valve was in the downshift position but are now also opposed by the primary hysteresis force acting on the unbalanced area of land *b*, which, subtracted from the spring and modulator force, provides a reduced total net force or downshift bias acting on the valve during downshift operation shown by the curve 182. This curve 182 illustrates the total net force and its change between zero and full torque demand. The governor force provided by governor pressure must reduce below the total net force at each torque demand value for a downshift.

Figure 10:
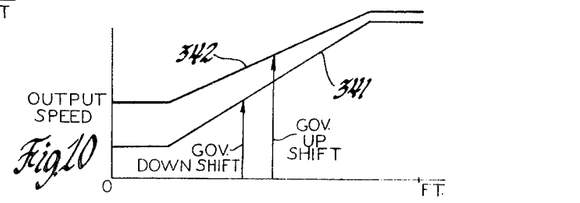
FIG. 10 shows curves illustrating the variation in governor upshifts and downshifts with variations of throttle or torque demand.

Thus the governor pressure or speed at which the transmission downshifts at each torque demand setting, illustrated by curve 341, FIG. 10, is always less than the upshift speed, illustrated by curve 342, but increases at a faster rate with increasing torque demand so the differential between up and downshift speeds decreases with increasing torque demand.

This difference between the upshift and downshift speeds is large at low torque demand values where each speed drive may be used in a larger range of output speeds for optimum pleasability and provide performance commensurated with low torque demand requirements. With increasing torque demand the range of output speeds in each drive speed gradually decreases to a minimum value determined only by the primary hysteresis force and only sufficient to prevent hunting to provide performance commensurate with torque demand.

Figure 4:
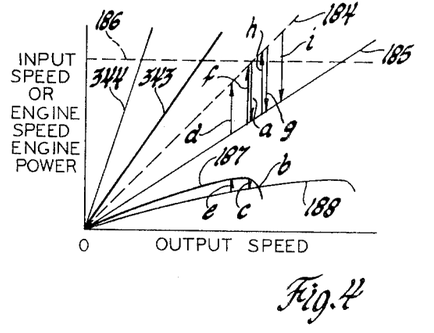
FIG. 4 shows torque demand pressure curves for FIG. 2.

FIG. 4 shows a typical plot of transmission input speed against output speed for a low speed drive 184 and a high speed drive 185 like in transmission 9 and the governed or rated engine speed for maximum engine power 186. At full throttle the upshift speed is selected so that when the transmission is operating in low speed, curve 184, the shift occurs as indicated by arrow *a* at an engine or input speed substantially equal to and preferably a little less than the engine or input speed for maximum engine power. The difference shown in FIG. 4 is merely sufficient so that, notwithstanding tolerance variations of the engine governor and/or the transmission governor, the upshift speed does not exceed the speed for maximum power.

The typical lower speed drive power curve 187 rises more rapidly and falls off at a lower output speed than the higher speed drive power curve 188 so at lower speed, curve 187 crosses higher speed curve 188 at a point *b* determining the output speed at which output power will be the same before and after the shift. The shift arrow *a* is thus at an output speed indicated at *c* slightly less than the output speed of crossover point *b*. The full throttle downshift occurs at an output speed only sufficiently less to prevent objectionable hunting as indicated by arrow *d* and on the power curves by arrow *e*. The small area between the power curves and between arrows *c* and *e* indicate the minimal power loss with this type shift. With reduced torque demand upshift, arrow *a*, and downshift, arrow *d* will occur at lower speeds. Because the downshift speed decreases at a faster rate than the upshift speed relative to torque demand, the difference between upshift speed and downshift speed increases as torque demand decreases.

When the throttle 128 is advanced to full throttle position to supply detent pressure by detent line 133, shuttle valve 134 and downshift line 156 to chamber 155, control valve element 152 is inactivated and only detent pressure opposed by governor pressure and in upshift position hysteresis pressure acts on shift valve element 138. These pressure values and the valve areas provide a detent downshift at high drive speeds up to the speed where on a downshift to low speed drive the engine speed will be the governed or rated maximum power speed. Thus the highest speed downshift occurs at substantially the same or preferably a slightly lower output speed than the normal automatic upshift speed, arrow *a*, as indicated by arrow *f*.

A detent upshift is spaced therefrom by the same hysteresis force used in automatic shifting and occurs above the governed or rated speed as indicated by arrow *g* intersecting the lower speed curve 184 above the governed or rated speed 186. Thus a detent upshift would not normally occur except on overrun.

When selector valve 44 is in the drive one position, D1, a hold regulated pressure is supplied via drive one line 53, shuttle valve 134 and downshift line 156 to chamber 155. Detent pressure is blocked and cannot enter chamber 155. Hold pressure inactivates control valve element 152 and only hold pressure opposed by governor pressure and in the upshift position hysteresis pressure act on the shift valve element 138. The hold pressure valve is higher than detent pressure to provide hold downshift at an output speed which will increase the input and engine speed above the governed or rated speed, preferably by a small amount as indicated by the arrow *h* for improved engine braking. Hold downshifts cannot be made at higher speeds. The hold upshift occurs at a higher engine speed and output speed, as indicated by arrow *i*, where further increased engine speed is not desired. This higher engine speed is above rated speed (curve 186) and is forced by some external means as vehicle coasting.

MODIFICATION

Figures 2, 2A:
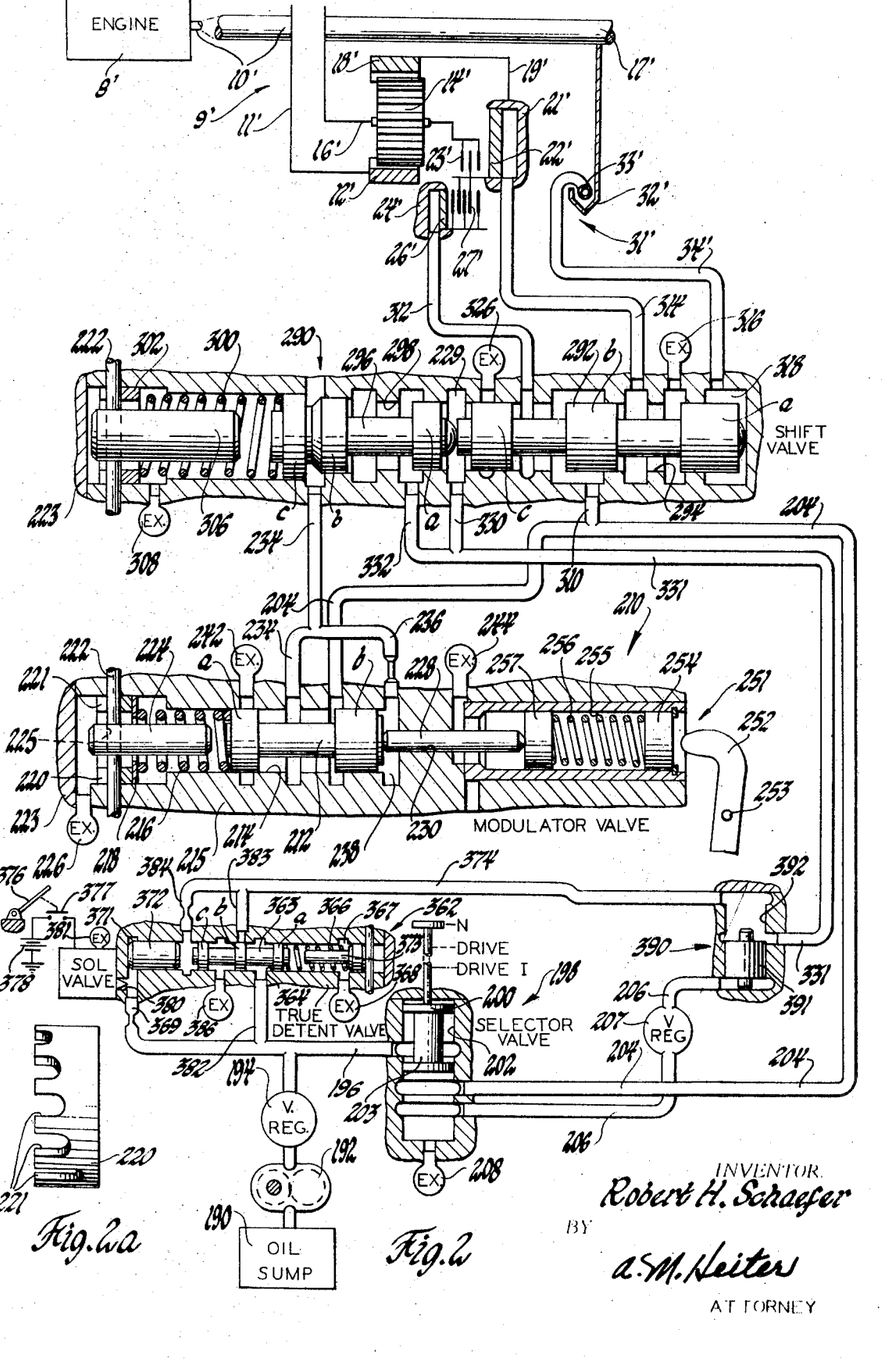
FIG. 2 schematically shows a transmission and automatic shifting with a single torque demand pressure.
FIG. 2a shows an adjustable spring seat ring.

The modified automatic multispeed transmission, in FIG. 2, is illustrated by two speed unit 9' and governor 31' like the above described two speed unit 9 and governor 31. Exhaust fluid from the control and lubrication system returns to the sump 190 and is delivered by the input driven pump 192 at a pressure regulated by the regulator valve 194 to the main line 196. A manual selector valve 198 has a valve element 200 slidable in bore 202 and having a recess 203 which, in the neutral position shown, blocks passage from the main line 196 and connects the drive line 204 and the drive 1 line 206 to exhaust 208. When the valve is moved to the drive position, the main line is connected to the drive feed line 204 and when moved to the drive 1 position, is connected to both the drive feed line 204 and the drive 1 feed line 206. Regulator valve 207 regulates drive 1 pressure at a lower value, i.e. 30 p.s.i. than main line regulator valve, i.e. 100 to 150 p.s.i.

The inverted modulator valve 210 provides a pressure inversely proportional to torque demand. Modulator valve 210 has a valve element 212 having equal diameter lands *a* and *b* located in a bore 214 in body 215. The valve element is biased in a pressure increasing direction by a biasing spring 216 which seats against a spring seat washer 218 abutting the adjustable spring seat ring 220 which is held in any one of several adjusted positions by the fastener pin 222. Fastener pin 222 also supports a stop pin 224 which prevents excessive movement of the valve, excessive compression of the spring and guides the spring coils to keep them aligned.

The spring seat ring 220 shown in FIG. 2a has a series of recesses 221 of gradually differing depth on each side of the ring with pairs of recesses of the same depth being diametrically opposite to each other. Before the valve cover 223 is placed over the end of the bore, the valve element, spring seat washer, spring seat ring and stop pin are assembled in the bore and the fastener pin is inserted through a pair of diametrically opposite recesses in the spring seat ring and an aperture 225 in pin 222 to locate the spring seat and stop pin. With this construction, the compression of spring 216 may be adjusted by removing the cover 223 and pushing the seat ring 220 into the bore against the spring until the recesses 221 clear the pin 222 and then rotating the seat ring so the pair of recesses with the desired depth seat on fastener pin 222. The spring chamber is vented by exhaust 226. Land *b* at the other end of the valve engages a force transmitting strut or pin 228 which is reciprocally mounted in a bore 230 in the end wall of the bore 214.

Though the above described vacuum actuator 75 in FIG. 1 may be used with strut 70 engaging pin 222 to actuate inverted modulator valve 210 to directly provide inverted modulator pressure, as illustrated by curve 126 in FIG. 3, a mechanical actuator 251 has been shown. The mechanical actuator has a lever 252 moved from zero to full torque demand positions by a throttle pedal, a diesel fuel feed rack, a fuel feed control actuated by an engine speed governor, a speed control of a fuel feed governor or other torque demand control devices.

The lever 252 is pivoted by pivot 253 and engages plug 254 slidable in bore 255 to compress spring 256 and act through slidable plug 257 on pin 228. Bore 255 is vented by exhaust 244. The lever has an initial clearance movement and movement like actuator force curve 84, so the spring reduces inverted modulator pressure to zero just before full torque demand to provide an inverted modulator pressure in line 234 according to curve 126. This spring actuator force, like curve 84 is transmitted by pin 228 to the valve element 212. In the short range of closed and part throttle positions when there is no spring force supplied to pin 228, during the clearance movement of lever 252, the valve 212 is in the position connecting drive line 204 between the lands $a$ and $b$ to the inverted modulator pressure line 234 and via the restricted branch 236 to the closed chamber 238 to act on the end land $b$ to provide a pressure regulated at the value of spring 216 as shown by the initial constant pressure portion of the inverted modulator pressure curve 126. The flat portion of this curve extends beyond the initial increase in actuator force as indicated in FIG. 3 by the distance, small pin effect, because the inverted modulator pressure in chamber 238 opposes the force transmitted from the actuator 251 by pin 228. Thus, an initial flat or constant pressure portion of the inverted modulator pressure curve 126 is accurately determined by the force of spring 216 and valve land area and may be made longer by increasing the diameter of pin 228 to delay the decrease of inverted modulator pressure. As the actuator force increases, inverted modulator pressure decreases as indicated by curve 126. The inverted modulator pressure is reduced to zero, which as pointed out above is always zero, and absolute value not subject to tolerance and signal variations, at a high throttle or torque demand value slightly lower than the torque demand value at which the actuator output force exceeds the force of spring 216 to hold the regulating valve element 212 to the left to first block the inlet port and then vent fluid from inverted modulator line 234 to exhaust 242.

Shift valve 290 has a shift valve element 292 having lands $a$, $b$ and $c$ located in a bore 294. The valve land $a$ is slightly smaller than the valve land $b$ so that on an upshift the fluid pressure supplied to engage a drive flowing between these lands acts on the larger area of land $b$ to provide a primary hysteresis force acting in the upshift direction. The land $c$ is the same size as land $b$. The control valve 296 has lands $a$, $b$ and $c$ of increasing diameter located in a three stepped bore 298. A spring 300 engages the end of control valve 296 and seats on an adjustable seat 302, like the above described seat 220, and is similarly secured to the valve body by a similar pin 222. A stop pin 306 suitably mounted on the pin 222 limits compression of the spring 300 and fits within the spring which fits in the bore to locate and guide the spring. The exhaust 308 vents the spring chamber.

With the valve in the downshift position shown, drive pressure line 204 is connected by branch 310 between the lands $b$ and $c$ to the low speed drive apply line 312 to place the transmission in the low speed drive. The high speed drive apply line 314 is connected to exhaust 316. The governor pressure in line 34' is connected to the closed chamber 318 at the end of the bore 294 and acts on the land $a$ in an upshift direction. The inverted modulator pressure, as illustrated by curve 126, FIG. 3, is supplied by line 234 to the space between lands $b$ and $c$ of control valve 296 and acts on the unbalanced area of land $c$ to provide a bias force on the control valve in an upshift direction against the force provided by spring 300.

Figure 7:
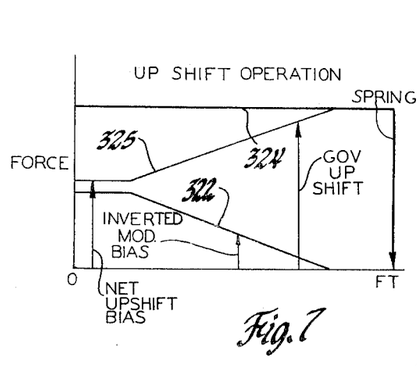
FIGS. 7 and 8 respectively show upshift and downshift operation curves for FIG. 2.

The inverted modulator force varies like the inverted modulator pressure with increasing throttle or torque demand as illustrated by curve 322 in FIG. 7. The constant spring force, shown by curve 324, is opposed by the inverted modulator force which therefore has a negative value and is subtracted from the spring force to determine the net summation force opposing an upshift, shown by curve 325, when the shift valve is in a downshift position. At any torque demand value when the speed of the output shaft has a value providing a governor pressure force greater than the net summation downshift force, curve 325, the control valve and the shift valve will upshift together. In the upshift position, the drive line 204 is connected by branch 310 between lands $a$ and $b$ to high speed apply line 314 to engage high ratio. The low speed ratio is disengaged by the connection of low speed apply line 312 between lands $b$ and $c$ to exhaust 326.

Figure 8:
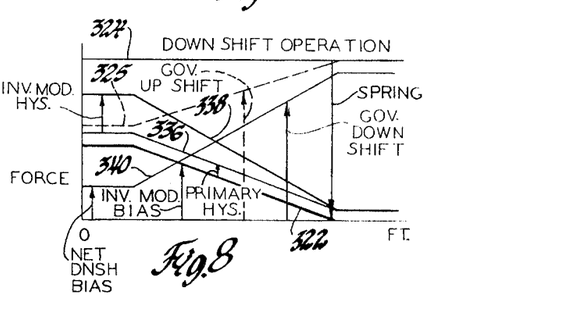

During the normal automatic shifting operation the downshift chamber 229 between the control valve element 296 and the shift valve element 292 is exhausted by branches 330 and 332 of downshift line 331 as described below. When the upshift is completed, the land $a$ of control valve 296 closes branch 332 and the land $b$ uncovers the port of inverted modulator line 234 so that the inverted modulator pressure in addition to acting on the unbalanced area of land $c$, now also fills the space between lands $a$ and $b$ and additionally acts on the unbalanced area of land $b$ to provide an increased torque demand force acting on the valve in opposition to the spring 300. Also on an upshift, valve 292 has moved to the left, and since land $a$ is smaller than land $b$, the fluid at main line pressure connected to the high speed apply line 314 provides a primary hysteresis force in an upshift direction. These forces acting on the shift valve are illustrated in FIG. 8. The spring force, shown by curve 324, and the inverted modulator pressure acting on land $c$ provide inverted modulator force, shown by curve 322, and are the same as during upshift operation, FIG. 7. The added primary hysteresis force adds a constant value to inverted modulator curve 322 and the summation of these forces is represented by curve 336. The inverted modulator pressure is now acting on an additional area, land $b$ and provides an added inverted modulator hysteresis force which is added to the summation of forces represented by curve 336 and this summation is represented by the curve 338. Thus, summation curve 338 represents the total bias force opposing the spring force, including the sum of the torque demand forces, the normal inverted modulator bias and the inverted modulator hysteresis, and the constant primary hysteresis.

The net downshift bias force, the spring force, shown by curve 324, less the opposing total bias force, shown by summation curve 338, is represented by net downshift force curve 340 as it varies from zero to full throttle. When the governor pressure force is less than this net downshift force at any throttle position, the net downshift force overcomes governor force and a downshift will occur.

When the governor force exceeds the summation force opposing an upshift, curve 325, which increases at a low rate with increasing torque demand, the shift valve upshifts. The net downshift bias force, curve 340, and net upshift bias force, curve 325, increase respectively at a high and a low rate with torque demand so the downshift speed, curve 341, FIG. 10, and upshift speed, curve 342, similarly increase with torque demand. In both the FIG. 1 and FIG. 2 forms of the invention, the upshift speed, curve 342, increases with increasing torque demand at a slower rate than downshift speed and exceeds the downshift speed, curve 341, by the summation of the primary hysteresis and the inverted modulator hysteresis. The up and down shifts are located as in FIG. 4 and explained above for the FIG. 1 shift system.

A through detent valve 362, which has a valve element 363 having equal diameter lands $a$, $b$ and $c$ located in a bore 364 and is biased in an opening direction by a spring 366 located in the spring chamber 367 vented by exhaust 368. Main line pressure line 196 is connected through restricted passage 369 to a chamber 371 to act on the inactivating piston 372 to normally engage valve element 363 and hold it in the extreme right position against the stop element 373 so that the through detent valve does not deliver pressure to the detent line 374. When the throttle pedal 376 is at the full throttle position, it closes switch 377 connecting a grounded power source 378 to the solenoid valve 379 which opens the port 380 to exhaust 381, to vent fluid in chamber 371 to permit the detent valve 362 to regulate pressure. The regulated pressure is supplied from main line 196 via branch 382 to the space between lands $a$ and $b$ to the branch 383 of detent line 374 which is connected by restricted branch 384 to the space between the piston 372 and valve element 363 to initiate regulation of detent line pressure at a predetermined low value, i.e. 30—38 p.s.i., determined by spring 366. Excess pressure will move the valve element 363 against the spring 366 and connect the detent line to exhaust 386.

The shuttle valve 390 connects either detent line 374 or drive one line 206 to downshift line 331 and has a valve element 391 slidably in bore 392. The detent line and drive one line are connected to opposite ends of the bore. The downshift line is connected to the center of the bore and is open when the valve element is at either end of the bore so either the detent line or the drive one line are connected to the downshift line.

When the selector valve 198 is moved to the drive one position, the main line 196 in addition to supplying drive line 204, also supplies drive one line 206 which is regulated by low pressure regulator valve 207 and connected by shuttle valve 390 and downshift line 331 to the space 229 between shift valve 292 and control valve 296. When the valves are in the downshift position shown, the connection is made by branch 330 when the valves are in the upshift position by branch 332.

This drive one pressure has a value higher than detent pressure such that the shift valve will remain downshifted at all speeds attainable in low speed drive with the engine driving the load as indicated by the hold downshift vector $h$ in FIG. 4, which indicates the highest speed at which the drive one pressure will downshift the transmission. When a manual downshift is made at this highest speed during overrun, the engine will be motored at a speed greater than governed or rated speed, curve 186, as indicated by hold downshift vector $h$ intersecting low speed line 184 above governed or rated speed line 186. The hold pressure in drive one line is regulated by regulator valve 209 at a value so governor pressure and primary hysteresis pressure will hold the shift valve upshifted until the output speed reduces to a value so that after a downshift, vector $h$, the input or engine speed, provides good engine braking without excessive abuse of the engine. At a higher output speed, determined in relation to the above downshift speed by the fixed primary hysteresis force, governor pressure, acting alone with the shift valve downshifted, will overcome hold pressure to upshift the shift valve to prevent excessive engine speed as indicated by vector $i$, FIG. 4.

The detent control, which may be attached to the manual fuel feed control or throttle pedal 376, supplies detent pressure by detent line 374, shuttle valve 390 to downshift line 331 and chamber 229 when the shift valve is in an upshift and downshift position.

If the higher hold pressure is present in line 206, shuttle valve 390 will block detent line 374 and inactivate the detent control system. The detent pressure provides a detent downshift indicated by vector $f$, FIG. 4, substantially at the same speed as the normal automatic upshift speed, vector $a$. The detent pressure provides a manual control so the transmission may be downshifted at the normal upshift speed to obtain a drive with the engine at the maximum power speed so the operator can anticipate an increase in load and need not wait for the small speed decrease before obtaining the normal automatic upshift, vector $d$. The detent upshift vector $g$ will not occur under drive, since it is above rated engine speed, but only on overrun.

This detent control is useful with engines having maximum power and torque in a small speed range. Many modern engines have a sufficiently wide speed range of maximum power and torque that this automatic shift control with the small hysteresis effect at full torque demand to make it unnecessary to have a detent control for driving with maximum power available on downshifts.

It will be appreciated that this shift control system may be applied to a transmission having additional ratios represented by speed curves 343 and 344, FIG. 4, as disclosed in a concurrently filed application Ser. No. 852,760 (A-10,326) by the applicant and Joseph R. Fox, directed to a multispeed transmission employing this shift control system and said application is incorporated by reference herein. The drive one or hold regulator valve 207 disclosed herein is disclosed with more detail as hold regulator valve 209 in the above Ser. No. 852,760 (A-10,326).

As summarized in FIG. 10, it will be seen that in both embodiments the speed value at which the transmission upshifts increases with increasing throttle opening and the speed value at which the transmission downshifts also increases with increasing throttle opening but is always of a lesser value or a value not exceeding the governor upshift speed and increases at a faster rate from zero to full throttle so that the difference between the governor upshift and the governor downshift speed value at each torque demand value decreases with increasing torque demand. This provides a shift control system more sensitive to load at higher torque demand values and thus is particularly suitable for vehicles having a lower power to weight ratio, such as some low power passenger cars and especially trucks, buses and other heavy duty or working vehicles. The minimum difference between governor upshift and downshift speeds, which is at full torque demand, is determined by the primary hysteresis force. The initial flat portion of these curves, due to vacuum completely overcoming the actuator spring FIG. 1 or the initial clearance in the throttle linkage FIG. 2 and the inverted modulator pressure opposing the actuator force transfer by the strut pin to the valve, FIGS. 1 and 2, provides a flat speed curve at a selected range of low torque demand values. At the high rate of torque demand values, where the engine power is not increasing, the speed curves are also flat. The constant pressure force and speed values at the lowest and highest portions of the range of torque demand values, illustrated by the flat portions of the pressure, force and speed curves at the initial or lowest and terminal or highest torque demand values are determined by the components of this shift system, such as the springs and valve areas. As pointed out above, the initial portion of the modulator pressure curve 84 and the terminal portion of inverted modulator curve 126 are always zero, and thus they have an absolute value without variation. Thus, their value may be accurately determined by the shift system and is not subject to variation with the torque demand controls. Vacuum varies from engine to engine of the same make and linkages wear and are damaged in use, causing variations in the torque demand signal. With this system, such variations only change the point at which the sloped portion of the curved intersect the flat portions of the curves and thus have an insignificant effect on the system. Also, there is an improved match between the shifting operation and the engine.

In the above description, reference to direction, i.e. right or left in the drawing, is merely for convenience and it will be understood that the position of these valves relative to the transmission is not important relative to their operation. It will be appreciated that modifications may be made of the above described preferred embodiments of the applicant's invention.

I claim:

1. In a transmission; input means, output means; multispeed drive means operatively connecting said input means to said output means to provide a low speed drive and a high speed drive to said output means; governor means connected to said drive means providing a governor signal varying with the speed of said output means; biasing means providing a biasing signal varying with torque demand from a low value to a high value of torque demand and shift control means operatively connected to said drive means for providing in the downshift position said low speed drive and in the upshift position said high speed drive and biasing means signal and said governor signal acting on said shift control means for upshifting from said downshift position to said upshift position at upshift speeds of said output means increasing with increasing torque demand and downshifting from said upshift position to said downshift position at downshift speeds of said output means increasing with increasing torque demand and said downshift speeds not exceeding said upshift speeds at each torque demand value between said low value and high value of torque demand and the difference between said upshift speed and said downshift speed at each torque demand value decreasing as the torque demand value increases from said low value to said high value.

2. The invention defined in claim 1 and said shift control means having hysteresis means determining the minimum difference between said upshift speed and said downshift speeds.

3. The invention defined in claim 1 and said biasing means providing a biasing signal having a constant value from zero torque demand through a range of low torque demand values.

4. The invention defined in claim 3 and providing a biasing signal having a constant value from a high torque demand value to the maximum torque demand value.

5. The invention defined in claim 1 and said biasing means providing a biasing signal having a constant value from a high torque demand value to the maximum torque demand value.

6. The invention defined in claim 1 and said governor means providing a governor signal increasing with increasing output speed and said biasing means providing a first biasing signal increasing at a slow rate with increasing torque demand from a low torque demand to a high torque demand and a second biasing signal increasing at a higher rate with increasing torque demand and not exceeding said first biasing signal at each torque demand value from a low torque demand to a high torque demand and said shift control means being urged in an upshift direction by said governor signal and in a downshift direction by said first biasing signal when upshifting and by said second biasing signal when downshifting.

7. The invention defined in claim 6 and said biasing means having a spring and torque demand means providing a torque demand signal inversely proportional to torque demand and providing said second biasing signal by said spring opposed by full action of said torque demand signal and said first biasing signal by said spring opposed by partial action of said torque demand signal.

8. The invention defined in claim 7 and said torque demand means being controlled by engine manifold vacuum.

9. The invention defined in claim 6 and said biasing means having a spring and torque demand means providing a first torque demand signal directly proportional to torque demand and a second torque demand signal inversely proportional to torque demand and providing said first biasing signal by the action of said spring assisted by both torque demand signals and said second biasing signal by the action of said spring assisted by said first torque demand signal.

10. The invention defined in claim 9 and said first torque demand signal being controlled by engine vacuum and the second torque demand signal by said first torque demand signal.

11. In a transmission; input means; output means; multispeed drive means operatively connecting said input means to said output means having fluid operated means to provide a low speed drive and a high speed drive to said output means; governor means connected to said drive means providing a governor pressure varying with the speed of said output means; biasing means including torque demand means providing at least one torque demand pressure varying with torque demand from a low value to a high value of torque demand and providing a biasing signal varying with at least one torque demand pressure, a source of fluid under pressure and shift valve means operatively connecting said source to said fluid operated means for providing in the downshift position said low speed drive and in the upshift position said high speed drive and said biasing signal and said governor pressure acting on said shift valve means for upshifting from said downshift position to said upshift position at upshift speeds of said output means increasing with increasing torque demand and downshifting from said upshift position to said downshift position at downshift speeds of said output means increasing with increasing torque demand and said downshift speeds not exceeding said upshift speeds at each torque demand value between said low value and high value of torque demand and the difference between said upshift speed and said downshift speed at each torque demand value decreasing as the torque demand value increases from said low value to said high value.

12. The invention defined in claim 11 and said shift valve means having hysteresis means operative in the upshift position to provide a minimum difference between said upshift speeds and said downshift speeds.

13. The invention defined in claim 11 and said governor pressure increasing with output speed; said biasing means providing a first biasing signal increasing at a slow rate with increasing torque demand from a low torque demand to a high torque demand when said shift valve means is in said downshift position and a second biasing signal increasing at a higher rate with increasing torque demand and not exceeding said first biasing signal when said shift valve means is in said upshift position and said governor pressure acting to upshift said shift valve means and said biasing signals acting to downshift said shift valve means.

14. The invention defined in claim 13 and said biasing means having a spring and torque demand valve means responsive to engine vacuum providing a torque demand pressure inversely proportional to engine vacuum and providing said first biasing signal by said spring opposed by said torque demand pressure acting on a large area opposing said spring and said second biasing signal by said spring opposed by said torque demand pressure acting on a smaller area opposing said spring.

15. The invention defined in claim 13 and said biasing means having a spring and a first torque demand valve controlled by vacuum providing a biasing modulated pressure directly proportional to torque demand and a second torque demand valve controlled by said modulated pressure and providing an inverted modulator pressure inversely proportional to torque demand and said first biasing signal being provided by said spring opposed by both said modulator pressures and said second biasing signal being provided by said spring opposed by said biasing modulator pressure.

16. In a transmission; input means; output means; multispeed drive means operatively connecting said input means to said output means having fluid operated means to provide a low speed drive and a high speed drive to said output means; governor means connected to said drive means providing a governor pressure varying with the speed of said output means; a biasing spring; torque demand valve means providing a torque demand pressure varying inversely from a low value to a high value of torque demand and a source of fluid under pressure; shift valve means operatively connecting said source to said fluid operated means for providing in the downshift position said low speed drive and in the upshift position said high speed drive and said governor pressure acting on said shift valve means for upshifting said biasing means acting on said shift valve means for downshifting and said torque demand pressure acting on said shift valve means for upshifting from said downshift position to said upshift position at upshift speeds of said output means increasing with increasing torque demand and downshifting from said upshift position to said downshift position at downshift speeds of said output means increasing with increasing torque demand and said downshift speeds not exceeding said upshift speeds at each torque demand value between said low value and high value of torque demand and the difference between said upshift speeds and said downshift speed at each torque demand value decreasing as the torque demand value increases from said low value to said high value.

17. The invention defined in claim 16 and said shift valve means having primary hysteresis means operative in said upshift means to provide an additional upshift bias to establish a minimum differential between said upshift and downshift speeds.

18. The invention defined in claim 16 and said shift valve means having small area means and large area means said torque demand pressure acting on said small area means during upshifting and on said large area means during downshifting.

19. The invention defined in claim 16 and a second torque demand valve means responsive to engine vacuum providing a second torque demand pressure directly proportional to torque demand from said low to said high torque demand values; said first torque demand valve means being an inverting regulating valve responsive to said second torque demand pressure and said shift valve means having a first and second area means and said second torque demand pressure acting on said second area means during upshifting and downshifting and said first torque demand pressure acting on said first area only during upshifting.

20. The invention defined in claim 16 and said torque demand valve means having a regulator valve element means having an area and connected to receive fluid from said source for regulation of torque demand pressure and a spring biasing said valve element means in one direction having a control chamber receiving torque demand pressure acting on a valve area for biasing said valve element means in the opposite direction for regulation of torque demand pressure at a maximum value determined by said spring and torque demand actuator means providing a force proportional to torque demand having a pin extending into said chamber and biasing said valve element in said opposite direction to provide an initial constant high pressure torque demand pressure determined by said spring, valve element means area and pin diameter and then regulate torque demand pressure inversely proportional to torque demand.

21. The invention defined in claim 20 and said torque demand valve means having a valve body having a bore for said valve element and a transverse hole through the body intersecting said bore; said spring being a coil spring; a spring seat ring having a plurality of opposed pairs of recesses with different pairs of recesses having different depths on one face and the opposite face engaging said spring; a guide pin within said coil spring having an opening a fastener pin extending through said hole in said valve body, one of said pair of recesses in said spring seat ring and said opening in said guide pin to secure said guide pin in position to guide said pin and limit movement of said valve element and for adjustably mounting said spring seat ring for adjustment by moving the seat ring against the spring free of said fastener pin and rotating said seat ring to another pair of recesses.

22. In a transmission; input means; output means; multispeed drive means operatively connecting said input means to said output means having fluid operated means for providing a low speed drive and a high speed drive to said output means; a source of fluid under pressure; torque demand valve means having a bore with a closed chamber at one end of the bore and valve element means in said bore having an unbalanced area in said chamber, said bore having a connection to said source, to exhaust and a torque demand passage connected to said chamber, a spring biasing said valve element means in one direction and torque demand pressure in said chamber basing said valve element means in the opposite direction to regulate the torque demand pressure at a value determined by said spring and area and torque demand actuator means providing a force proportional to torque demand acting on a strut extending through said chamber and biasing said valve element means in said opposite direction to provide an initial constant torque demand pressure at a high value and then regulate said torque demand pressure inversely proportional to torque demand and shift means connecting said source to said fluid operated means operatively connected to said torque demand value means.

23. The invention defined in claim 22 and said actuator having a spring providing the constant actuator bias and a movable wall responsive to engine manifold vacuum opposing said spring force with a force larger than said spring force in the high vacuum range during idle and a low range of throttle openings to provide a net actuator force having a zero value in said low range of throttle openings and then a force increasing proportionally with decreasing vacuum.

24. In a torque demand modulator; torque demand valve means having a bore with a chamber and valve element means in said bore having a unbalanced area in and closing said chamber, said bore having a port for connection to a source of fluid under pressure, an exhaust port and a torque demand port connected to said chamber, a spring biasing said valve element means in one direction and torque demand pressure in said chamber biasing said valve element means in the opposite direction to regulate the torque demand pressure at a value determined by said spring and area and torque demand actuator means providing a force proportional to torque demand acting on a strut extending through said chamber and biasing said valve element means in said opposite direction to provide an initial constant torque demand pressure at a high value and then regulate said torque demand pressure inversely proportional to torque demand.

25. The invention defined in claim 24 and said actuator having a spring providing the constant actuator bias and a movable wall responsive to engine manifold vacuum opposing said spring force with a force larger than said spring force in the high vacuum range during idle and a low range of throttle openings to provide a net actuator force having a zero value in said low range of throttle openings and then a force increasing proportionately with decreasing vacuum.

26. In a transmission; input means; output means; multispeed drive means connecting said input means to said output means and providing a low speed drive and a high speed drive to said output means; signal means for providing a torque demand signal varying with torque demand between zero and full torque demand within a range of tolerances; biasing means for providing a biasing signal varying with said torque demand signal in a middle range of torque demand values, a predetermined biasing signal value at said zero torque demand and at said full torque demand, one of said predetermined biasing signal values being high and the other low, and providing controlled biasing signal values between said predetermined biasing signal value at said zero and full torque demand fairing into each adjacent end portion of said biasing signal in said middle range of torque demand values and said controlled and middle range biasing signal values all being equal to or between said high and low predetermined biasing signal values and shift means operatively connected to said biasing means to control said shift means and operatively connected to said drive means to selectively establish said low and high speed drive.

27. The invention defined in claim 26 and said controlled biasing signal values being a constant value equal to said high and low predetermined biasing signal values extending to the adjacent portion of said middle range of biasing signal values and limiting said middle range of biasing signal values to values between said high and low predetermined biasing signal values.

28. The invention defined in claim 27 and said biasing means including regulator valve means biased in an opening direction by a spring and in a closing direction by the biasing signal and the torque demand signal and the biasing signal partially opposing said torque demand signal to provide a constant biasing signal from zero torque demand through a substantial range of torque demand values.

29. The invention defined in claim 26 and governor means providing a governor signal proportional to the speed of said output means; said biasing means providing an upshift biasing signal increasing at a low rate with torque demand and a downshift signal increasing at a higher rate with torque demand and remaining less than said upshift signal and said shift valve means being biased in an upshift directed by said governor signal and when in the downshift position establishes said low speed drive biased in a downshift direction by said upshift biasing signal to control upshift to the upshift position establishing said high drive speed and then biased in a downshift direction by said downshift biasing signal to control the downshift.

30. The invention defined in claim 29 and said input means providing maximum power at a rated input speed; and said shift control means providing an upshift from said low to said high speed drive at said rated input speed at said high torque demand and providing a downshift from said high to said low speed drive at a downshift input speed less than said upshift speed by a small value only sufficient to prevent objectionable hunting.

31. The invention defined in claim 29 and said biasing means providing an upshift and lower downshift biasing signal having a controlled constant value from zero torque demand through a substantial range of low torque demand values to provide predetermined upshift and downshift speeds in said substantial range of low torque demand values.

32. In a transmission; input means providing maximum power at a rated input speed; output means; multispeed drive means operatively connecting said input means to said output means to provide a low speed drive and a high speed drive to said output means; governor means connected to said drive means providing a governor signal varying with the speed of said output means; biasing means providing at least one biasing signal varying with torque demand from a low value to a high value of torque demand and shift control means operatively connected to said drive means for providing in the downshift position said low speed drive and in the upshift position said high speed drive and said biasing means signal and said governor signal acting on said shift control means for upshifting from said downshift position to said upshift position at upshift speeds of said output means and when said biasing means provides said high torque demand at the upshift speed at which said input means is operating at said rated input speed with said multispeed drive means in said low speed drive and downshifting from said upshift position to said downshift position at downshift speeds not exceeding said upshift speeds.

33. The invention defined in claim 32 and said shift control means having hysteresis means predetermining the maximum difference between said upshift speed and said downshift speed at said high torque demand at a value only sufficient to prevent objectionable hunting.

34. The invention defined in claim 33 and said upshift speeds increasing with increasing torque demand at a slower rate than said downshift speeds increase with torque demand.

35. The invention defined in claim 32 and said input means providing substantially maximum power in a range of rated input speeds; said upshift speed at high torque demand being at the high speed in said range of rated speeds and the downshift speed at said high torque demand being at the low speed in said range of rated input speeds.

36. In a valve, a valve body having bore means having port means and a hole extending through said body transversely through said bore; valve element means reciprocally mounted in said bore cooperating with said port means to control the flow of fluid; control means to bias said valve element means in one direction; a coil spring in said bore to bias said valve element means in the opposite direction; a spring seat ring located for rotary and axial sliding movement in said bore having one side engaging said coil spring and the other side having a plurality of opposed pairs of recesses with different pairs of recesses having a different depth; guide pin means positioned within said coil spring to locate, guide and limit compression of said spring positioned with said spring seat ring and having a transverse opening and a fastening pin extending through said hole transversely through said body; one pair of said recesses and said transverse opening in said guide pin to secure these parts in position to provide a spring seat and compression limiting guide and provide for adjustment by moving said seat ring against said spring to free said recesses of said fastener pin and rotating said seat ring so on release of said ring another pair of recesses seat on said fastener pin.